Dec. 30, 1924.
E. P. KEIM
WINDSHIELD CLEANER
Filed July 9, 1923
1,520,904
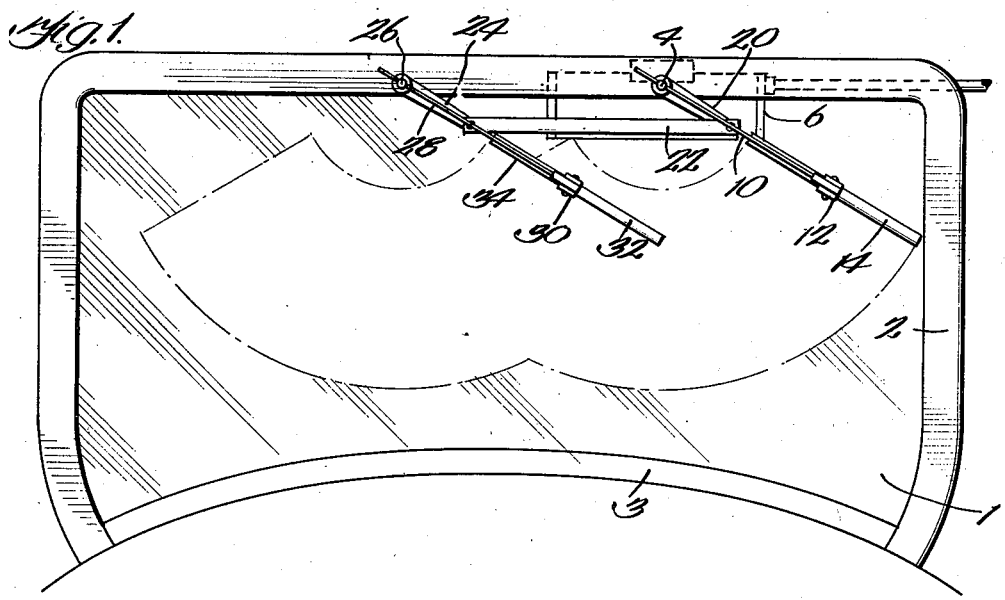
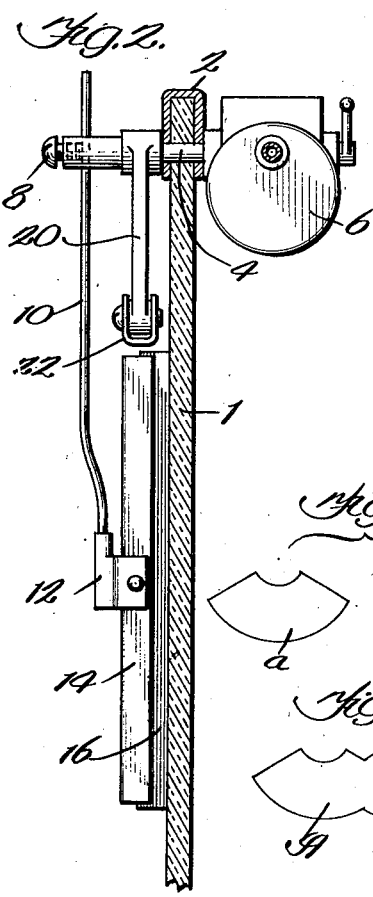
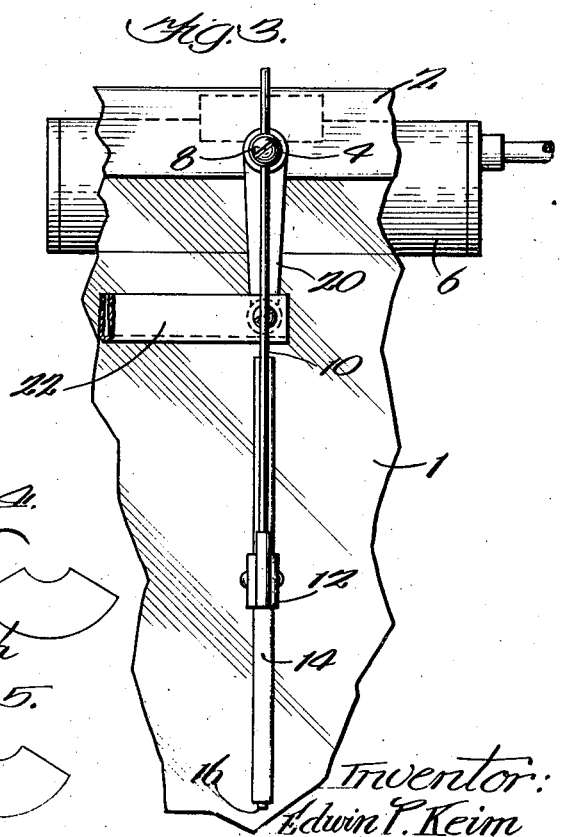
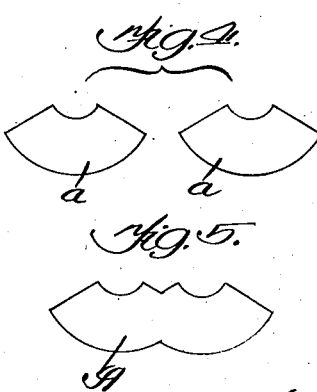
Inventor:
Edwin P. Keim
By Cheever & Cox Attys.

Patented Dec. 30, 1924.

1,520,904

UNITED STATES PATENT OFFICE.

EDWIN P. KEIM, OF CHICAGO, ILLINOIS.

WINDSHIELD CLEANER.

Application filed July 9, 1923. Serial No. 650,237.

*To all whom it may concern:*

Be it known that I, EDWIN P. KEIM, a citizen of the United States, residing at Chicago, in the county of Cook and State of Illinois, have invented a certain new and useful Improvement in Windshield Cleaners, of which the following is a specification.

My invention relates to wind shield cleaners, especially to that type used for automobile and other vehicles in which an arm is pivoted to the frame of the wind shield and swings in a vertical plane to remove rain, snow and sleet from the glass to clarify the vision of the driver. It is my purpose to provide a supplemental arm operated by the main mechanism and cooperating with the main arm in such manner as to produce a laterally elongated cleared area through which the driver will have a sweeping vision both towards the right and towards the left.

I accomplish my object by the mechanism illustrated in the accompanying drawings, in which—

Figure 1 is a front assembly view of my device applied to a wind shield of a motor vehicle.

Figure 2 is a sectional view taken vertically through the wind shield and showing in side elevation the cleaning arms and their operating mechanism.

Figure 3 is a front view of the parts shown in Figure 2.

Figure 4 is a diagrammatic view showing the shape of two cleaned areas which are non-adjacent to each other and which arrangement it is my purpose to avoid.

Figure 5 is a diagrammatic view showing the shape of the cleaned area which I am able to produce as a result of my invention.

Like numerals denote like parts throughout the several views.

In the drawings I have shown more or less conventionally a wind shield, the same having a glass 1 mounted in a marginal frame 2 above the hood 3. Passing through the wind shield near the top is a rock shaft 4. In practice this is oscillated back and forth by any suitable power device. Power devices for this purpose are well known and are operated sometimes electrically and sometimes pneumatically. In any event I have conventionally illustrated a power device by the cylinder 6 mounted behind the windshield in the manner indicated. Rigidly secured to the rock shaft by set screw 8 or other appropriate means is a vibrator rod 10, the lower end of which is provided with a clip 12 by which it is fastened to a holder 14 in which is mounted a rubber strip or squeegee 16. The latter is in contact with the glass and as the vibrator rod 10 swings back and forth the squeegee will remove from the surface of the glass the snow or moisture deposited upon it.

As thus far described, my mechanism has been heretofore known. I will now describe the novel elements by which I am able to obtain the particularly advantageous result hereinabove mentioned.

Rigidly fastened to the rock shaft 4 and vibrating with it is a depending arm 20. This is connected by a link 22 to a similar arm 24 located a slight distance toward the mid portion of the vehicle. This arm is rigidly secured to a second rock shaft 26 pivotally mounted near the top of the wind shield, preferably in the same manner as shaft 4. A vibrator rod 28 extends downward from rock shaft 26 and at the lower end has a clip 30 secured to a frame 32 which serves as a holder for a second squeegee 34 like the one 16 previously described. The spacing of the shafts 4, 26 relatively to each other and relatively to the distance of said shafts from the ends of their respective squeegees is of special importance. If these shafts are located too far apart the cleaned areas will either be entirely separate as indicated by the two spaces a, a Figure 4, or they will overlap to such a slight degree that there will be practically an intervening uncleaned area between them which will obstruct the vision of the driver. According to my invention the parts are so proportioned that the cleaned areas will overlap so as to make substantially one continuous laterally elongated area as indicated at A Figure 5. It will be observed that the overlap and the angle of swing are so arranged that the narrowest portion of the cleaned area is equal to about two-thirds of the length of the vibrating arm. To accomplish this the distance between the two rock shafts should not be much greater than the length of the arms if the distance is equal to the arms as illustrated in the drawing.

From the foregoing it will be evident that my device makes a cleaned area which is equal in height to the sector made by the previously known wind shield cleaners, but which is greatly elongated horizontally, thus giving a wide range of clear vision toward the mid portion of the vehicle. It will also be evident that this is accomplished by the addition merely of a second rock shaft and squeegee and a connecting rod, all of which are operated from the original power device. The consequence is that the mechanism is not rendered complex and the entire mechanism is operated from the single power device.

Another advantage of my device is that it is easily possible to convert an old type, single arm cleaner into my duplex cleaner without changing any of the old mechanism. The only thing necessary is to add a second arm and a rod 22 for connecting it to the original arm. The old parts, including the power device, can all be utilized without change.

Having thus described my invention what I claim as new and desire to secure by Letters Patent is:—

1. A windshield cleaner comprising a pair of shafts extending through the windshield at spaced points near the top thereof, an arm on each shaft carrying a wiper disposed against the windshield, another arm on each shaft between said first mentioned arms and the windshield respectively, and a link connecting said second mentioned arms whereby said shafts and consequently said wipers are movable in unison.

2. A windshield cleaner comprising a shaft, an arm on said shaft carrying a wiper disposed against the windshield, a second arm on said shaft between said first mentioned arm and the windshield, and means including a link connected with said second mentioned arm for operating the latter thereby to operate said first arm.

In witness whereof, I have hereunto subscribed my name.

EDWIN P. KEIM.